United States Patent
Zhuang et al.

(10) Patent No.: US 12,299,866 B2
(45) Date of Patent: May 13, 2025

(54) METHOD FOR AUTOMATICALLY DETECTING WAFER BACKSIDE BRIGHTFIELD IMAGE ANOMALY

(71) Applicant: Shanghai Huali Microelectronics Corporation, Shanghai (CN)

(72) Inventors: Junjun Zhuang, Shanghai (CN); Xu Chen, Shanghai (CN); Yansheng Wang, Shanghai (CN); Zhengying Wei, Shanghai (CN)

(73) Assignee: Shanghai Huali Microelectronics Corporation, Shanghai (CN)

( * ) Notice: Subject to any disclaimer, the term of this patent is extended or adjusted under 35 U.S.C. 154(b) by 390 days.

(21) Appl. No.: 17/941,222

(22) Filed: Sep. 9, 2022

(65) Prior Publication Data

US 2023/0410279 A1 Dec. 21, 2023

(30) Foreign Application Priority Data

Jun. 21, 2022 (CN) .......................... 202210703591.3

(51) Int. Cl.
*G06T 7/00* (2017.01)
*G06V 10/50* (2022.01)

(52) U.S. Cl.
CPC ............ *G06T 7/0004* (2013.01); *G06V 10/50* (2022.01); *G06T 2207/10052* (2013.01); *G06T 2207/30148* (2013.01)

(58) Field of Classification Search
CPC . G06T 2207/30148; G06T 2207/10052; G06T 7/0002–0016; G06V 10/98–993; G06V 10/50–507
See application file for complete search history.

(56) References Cited

U.S. PATENT DOCUMENTS

| | | | | |
|---|---|---|---|---|
| 2003/0107736 A1* | 6/2003 | Fujimoto | ................... | G06T 7/32 356/394 |
| 2007/0076943 A1* | 4/2007 | Wienecke | ............. | G06T 7/0004 382/145 |
| 2023/0122514 A1* | 4/2023 | Lauber | ..................... | G06T 7/13 382/149 |

FOREIGN PATENT DOCUMENTS

| | | | |
|---|---|---|---|
| CN | 114187228 A | * | 3/2022 |
| JP | 2004317190 A | * | 11/2004 |

OTHER PUBLICATIONS

Carlson et al, Correlation of wafer backside defects to photolithography hot spots using advanced macro inspection (Year: 2006).*

(Continued)

*Primary Examiner* — Oneal R Mistry
*Assistant Examiner* — Jongbong Nah
(74) *Attorney, Agent, or Firm* — Banner & Witcoff, Ltd.

(57) ABSTRACT

The present application provides a method for automatically detecting a wafer backside brightfield image anomaly, at least comprising: processing wafer backside brightfield images by means of histogram equalization, so as to obtain processed images; compiling statistics for a gray histogram of the processed images; calculating the number of abnormal pixels in each of the images; and providing a threshold, and highlighting the image with a score less than the threshold. In the present application, the wafer backside brightfield images are analyzed by means of image preprocessing and a specific calculation method, so as to quickly and automatically detect an abnormal wafer backside image.

7 Claims, 3 Drawing Sheets

(56) References Cited

OTHER PUBLICATIONS

Carlson, Alan, and Tuan Le. "Correlation of wafer backside defects to photolithography hot spots using advanced macro inspection." Metrology, Inspection, and Process Control for Microlithography XX. vol. 6152. SPIE, 2006. (Year: 2006).*

* cited by examiner

METHOD FOR AUTOMATICALLY DETECTING WAFER BACKSIDE BRIGHTFIELD IMAGE ANOMALY

CROSS-REFERENCE TO RELATED APPLICATIONS

This application claims priority to Chinese patent application No. 202210703591.3, filed on Jun. 21, 2022, the disclosure of which is incorporated herein by reference in its entirety.

TECHNICAL FIELD

The present application relates to the technical field of semiconductors, in particular to a method for automatically detecting a wafer backside bright field image anomaly.

BACKGROUND

Wafers may have different defect distribution maps due to different reasons during the manufacturing process, one of which is a wafer backside defect map. Wafer backside brightfield images have higher purity than darkfield images, and anomalies therein are easier to be found. Usually, manually screening out abnormal images by engineers has relatively low efficiency, and is prone to missing some hidden anomalies which are very difficult to be found by naked eyes. Therefore, specific preprocessing on the images is required, after which automatic calculation is performed to screen out abnormal images, so as to on the one hand improve the efficiency of the engineers and on the other hand to avoid missing the anomalies invisible to naked eyes.

BRIEF SUMMARY

In view of the above defect in the prior art, the objective of the present application is to provide a method for automatically detecting a wafer backside brightfield image anomaly, so as to solve the problem of low efficiency and missing in screening out abnormal images in the prior art.

In order to achieve the above objective and other related objectives, the present application provides a method for automatically detecting a wafer backside brightfield image anomaly, at least including:
  step 1, processing wafer backside brightfield images by means of histogram equalization, so as to obtain processed images;
  step 2, compiling statistics for a gray histogram of the processed images;
  step 3, calculating the number of abnormal pixels in each of the images; and
  step 4, providing a threshold, and highlighting the image with a score less than the threshold.

In some examples, the processed images in step 1 include normal images and abnormal images.

In some examples, during the histogram equalization for processing the wafer backside brightfield images in step 1, the abscissa axis of the histogram represents a pixel intensity, and the ordinate axis represents a total pixel intensity ratio.

In some examples, a larger distribution range of the pixel intensity along the abscissa axis of the histogram in step 1 represents a greater wafer backside image anomaly.

In some examples, during the statistics compiling for the gray histogram of the processed images in step 2, the abscissa axis of the gray histogram represents a pixel, the ordinate axis represents a gray value, and the statistics compiling for the gray histogram refers to compiling statistics for occurrence frequencies of all the pixels in the image according to the magnitudes of the gray values.

In some examples, the normal image and the abnormal image are distinguished from each other by means of the number of the abnormal pixels in step 3.

In some examples, the proportion of the abnormal pixels in each of the images is also calculated in step 3.

In some examples, after the proportion of the abnormal pixels in the image is calculated in step 3, the normal image and the abnormal image are distinguished from each other according to distributions of the abnormal pixels in a selected pixel range.

In some examples, the selected pixel range in step 3 is 0-100.

In some examples, the image highlighted in step 4 is the abnormal image invisible to naked eyes.

As stated above, the method for automatically detecting a wafer backside brightfield image anomaly of the preset application has the following beneficial effects: in the present application, the wafer backside brightfield images are analyzed by means of image preprocessing and a specific calculation method, so as to quickly and automatically detect an abnormal wafer backside image.

DETAILED DESCRIPTION OF THE DISCLOSURE

The embodiments of the present application are described below using specific examples, and those skilled in the art can easily understand other advantages and effects of the present application from the contents disclosed in the Description. The present application can also be implemented or applied using other different specific embodiments, and various details in the Description can also be modified or changed based on different viewpoints and applications without departing from the spirit of the present application.

Please refer to FIGS. 1-7. It should be noted that the drawings provided in this embodiment are only used to illustrate the basic concept of the present application in a schematic way, so the drawings only show the components related to the present application rather than being drawn according to the number, shape and size of the components in actual implementation. The type, number and proportion of various components can be changed randomly during actual implementation, and the layout of components may be more complicated.

Figure 7:
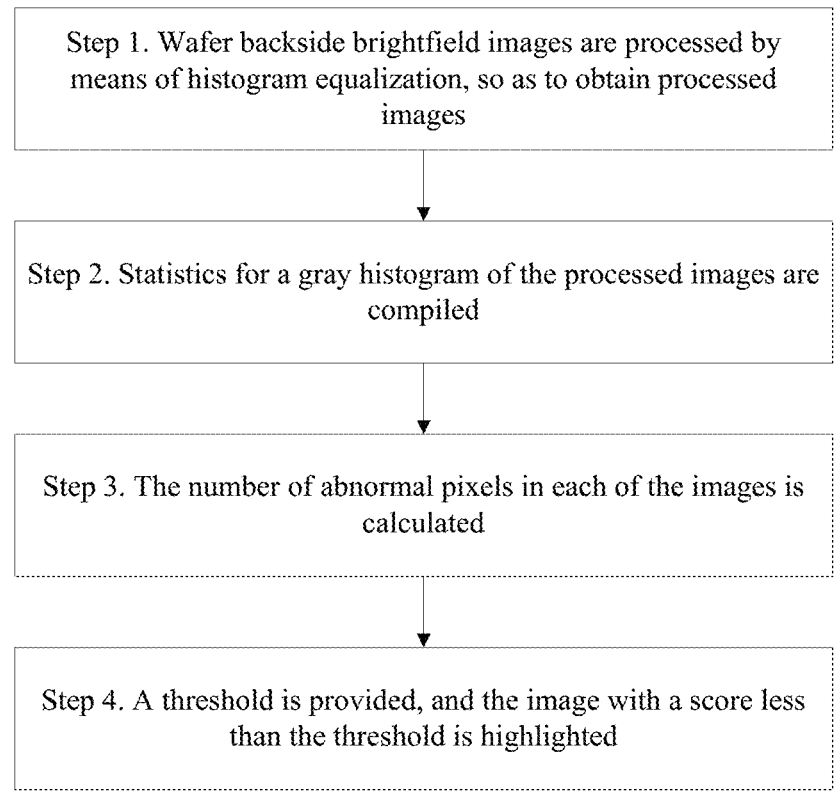
FIG. 7 is a flowchart of a method for automatically detecting a wafer backside brightfield image anomaly in the present application.

The present application provides a method for automatically detecting a wafer backside brightfield image anomaly. Referring to FIG. 7, FIG. 7 is a flowchart of the method for automatically detecting a wafer backside brightfield image anomaly in the present application. The method at least includes the following steps.

Step 1. Wafer backside brightfield images are processed by means of histogram equalization, so as to obtain processed images.

In this embodiment of the present application, the processed images in step 1 include normal images and abnormal images.

Figure 1:
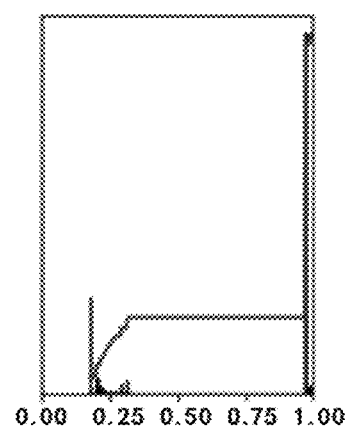
FIG. 1 is a histogram of abnormal images obtained after processing in step 1 of the present application.
Figure 2:
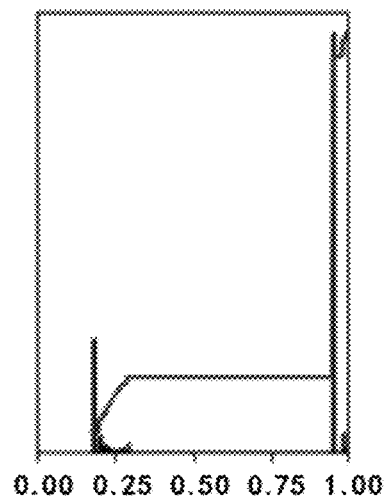
FIG. 2 is a histogram of normal images obtained after processing in step 1 of the present application.

In this embodiment of the present application, during the histogram equalization for processing the wafer backside brightfield images in step 1, the abscissa axis of the histogram represents a pixel intensity, and the ordinate axis represents a total pixel intensity ratio. Referring to FIGS. 1 and 2, FIG. 1 is a histogram of the abnormal images obtained after the processing in step 1 of the present application, and FIG. 2 is a histogram of the normal images obtained after the processing in step 1 of the present application. As can be seen from a comparison between FIG. 1 and FIG. 2, a larger distribution range of the pixel intensity along the abscissa axis represents a greater image anomaly.

In this embodiment of the present application, a larger distribution range of the pixel intensity along the abscissa axis of the histogram in step 1 represents a greater wafer backside image anomaly.

Figure 3:
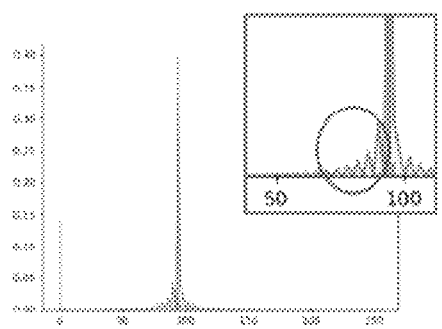
FIG. 3 is a gray histogram of the normal images processed in step 2 of the present application.
Figure 4:
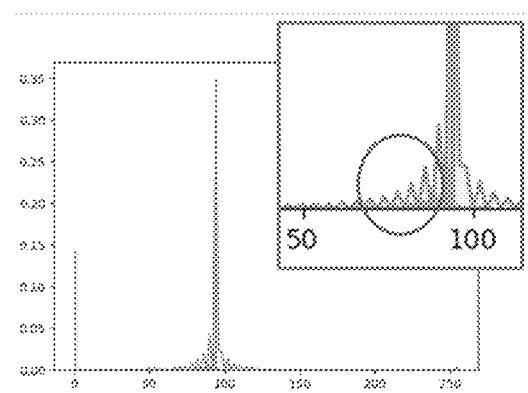
FIG. 4 is a gray histogram of the abnormal images processed in step 2 of the present application.

Step 2. Statistics for a gray histogram of the processed images are compiled. Referring to FIGS. 3 and 4, FIG. 3 is a gray histogram of the normal images processed in step 2 of the present application, and FIG. 4 is a gray histogram of the abnormal images processed in step 2 of the present application.

In this embodiment of the present application, during the statistics compiling for the gray histogram of the processed images in step 2, the abscissa axis of the gray histogram represents a pixel, the ordinate axis represents a gray value, and the statistics compiling for the gray histogram refers to compiling statistics for occurrence frequencies of all the pixels in the image according to the magnitudes of the gray values.

As can be seen from a comparison between FIG. 3 and FIG. 4, as the number of pixels in a pixel range of 0-100 decreases, the image becomes increasingly more normal; on the contrary, as the number of pixels in the pixel range of 0-100 increases, the image becomes increasingly more abnormal.

Step 3. The number of abnormal pixels in each of the images is calculated.

Figure 5:
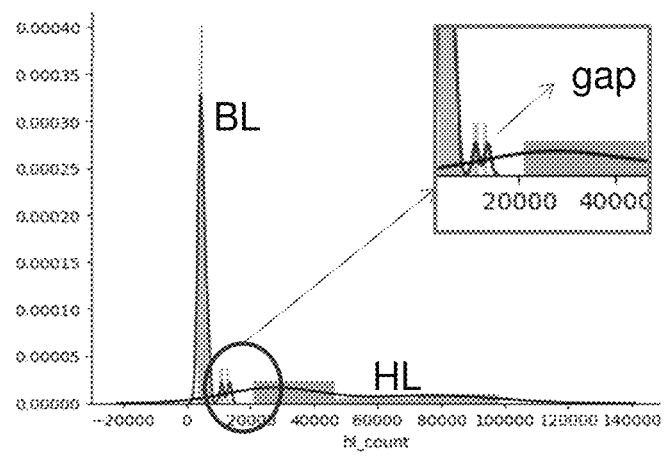
FIG. 5 is a distribution diagram of the number of abnormal pixels in the present application.

In this embodiment of the present application, the normal image and the abnormal image are distinguished from each other by means of the number of the abnormal pixels in step 3. Referring to FIG. 5, FIG. 5 is a distribution diagram of the number of abnormal pixels in the present application, wherein the black line represents the distribution of the number of abnormal pixels in the normal image. In this embodiment, for the normal image (BL in FIG. 5 represents a normal condition), the number of abnormal pixels in the pixel range 0-100 is less than 20000; for the abnormal image (HL in FIG. 5 represents an abnormal condition), the number of abnormal pixels in the pixel range 0-100 is greater than 20000.

In this embodiment of the present application, the proportion of the abnormal pixels in each of the images is also calculated in step 3. That is, the number of the abnormal pixels is converted into a score. In this embodiment, the score of the normal image is above 99, and the score of the abnormal image is below 98.

In this embodiment of the present application, after the proportion of the abnormal pixels in the image is calculated in step 3, the normal image and the abnormal image are distinguished from each other according to distributions of the abnormal pixels in a selected pixel range.

In this embodiment of the present application, the selected pixel range in step 3 is 0-100.

Step 4. A threshold is provided, and the image with a score less than the threshold is highlighted.

Figure 6:
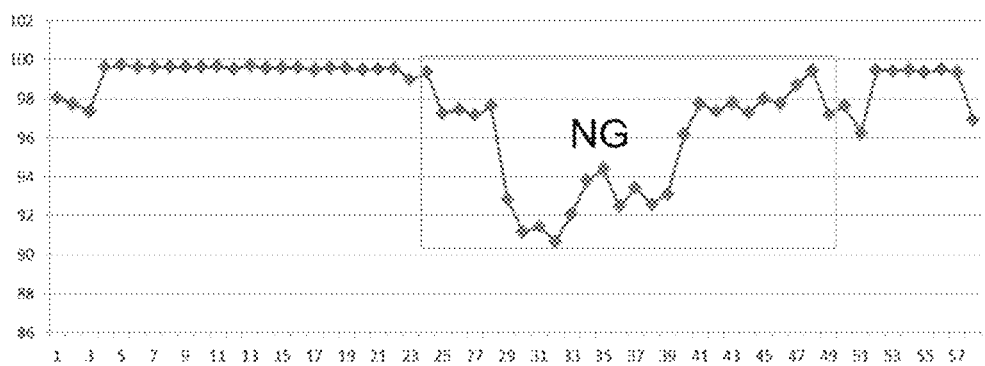
FIG. 6 is a distribution diagram of scores corresponding to the images in the present application.

In this embodiment of the present application, the image highlighted in step 4 is the abnormal image invisible to naked eyes. Referring to FIG. 6, FIG. 6 is a distribution diagram of scores corresponding to the images in the present application, wherein the score of an NG portion is lower than 98, which represents an abnormal image.

As stated above, in the present application, the wafer backside brightfield images are analyzed by means of image preprocessing and a specific calculation method, so as to quickly and automatically detect an abnormal wafer backside image. Therefore, the present application effectively overcomes various defects in the prior art and has high industrial utilization value.

The above embodiment merely illustrates the principle and effect of the present application, rather than limiting the present application. Anyone skilled in the art can modify or change the above embodiment without departing from the spirit and scope of the present application. Therefore, all equivalent modifications or changes made by those with ordinary knowledge in the art without departing from the spirit and technical idea disclosed in the present application shall still be covered by the claims of the present application.

What is claimed is:

1. A method for automatically detecting a wafer backside brightfield image anomaly, at least comprising:

step 1, processing wafer backside brightfield images by means of histogram equalization, so as to obtain processed images, wherein the processed images comprise normal images and abnormal images;

step 2, compiling statistics for a gray histogram of the processed images;

step 3, calculating a number of abnormal pixels in each of the images, wherein a proportion of the abnormal pixels in each of the images is also calculated, that is, the number of the abnormal pixels is converted into a score, the normal images and the abnormal images are distinguished from each other according to distributions of the abnormal pixels in a selected pixel range; and step 4, providing a threshold, and highlighting an image with a score less than the threshold.

2. The method for automatically detecting the wafer backside brightfield image anomaly according to claim 1, wherein, during the histogram equalization for processing the wafer backside brightfield images in step 1, an abscissa axis of the histogram represents a pixel intensity, and an ordinate axis represents a total pixel intensity ratio.

3. The method for automatically detecting the wafer backside brightfield image anomaly according to claim 1, wherein a larger distribution range of a pixel intensity along an abscissa axis of the histogram in step 1 represents a greater wafer backside image anomaly.

4. The method for automatically detecting the wafer backside brightfield image anomaly according to claim 1, wherein, during the statistics compiling for the gray histogram of the processed images in step 2, an abscissa axis of the gray histogram represents a number of pixels, an ordinate axis represents a gray value, and the statistics compiling for the gray histogram refers to compiling statistics for occurrence frequencies of all the pixels in the image according to magnitudes of gray values.

5. The method for automatically detecting the wafer backside brightfield image anomaly according to claim 1, wherein the normal images and the abnormal images are distinguished from each other by means of the number of the abnormal pixels in step 3.

6. The method for automatically detecting the wafer backside brightfield image anomaly according to claim 1, wherein the selected pixel range in step 3 is 0-100.

7. The method for automatically detecting the wafer backside brightfield image anomaly according to claim 1, wherein the image highlighted in step 4 is an abnormal image invisible to naked eyes.

\* \* \* \* \*